No. 758,004. PATENTED APR. 19, 1904.
J. A. FLEMING.
DEVICE FOR WIRELESS TELEGRAPHY.
APPLICATION FILED APR. 8, 1901.
NO MODEL. 2 SHEETS—SHEET 2.
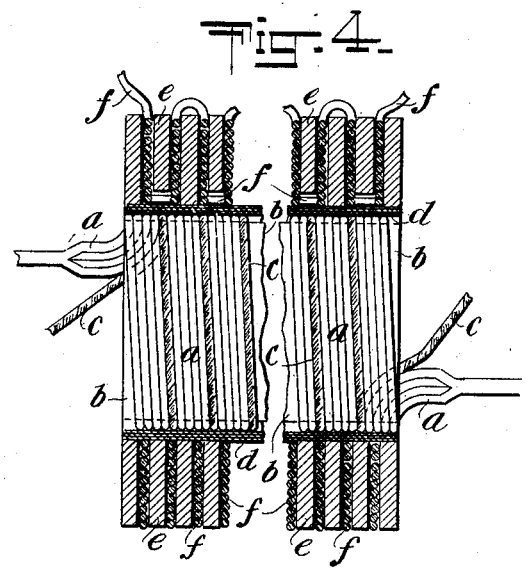
WITNESSES:
INVENTOR,
JOHN A. FLEMING,
BY
HIS ATTORNEYS.

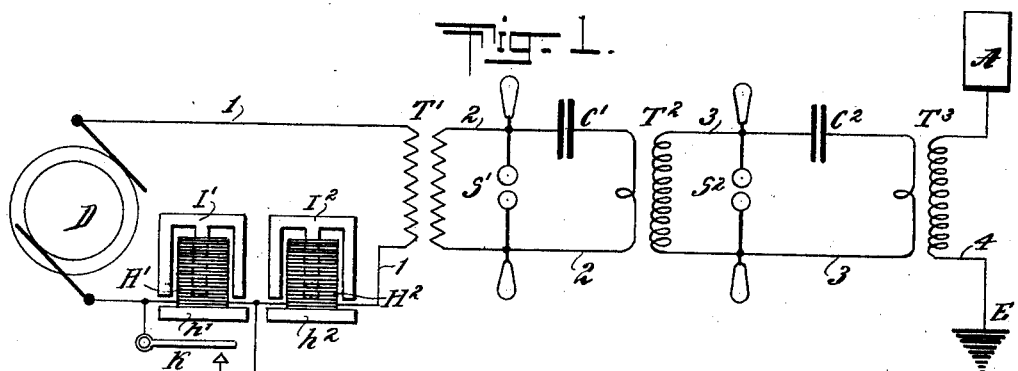
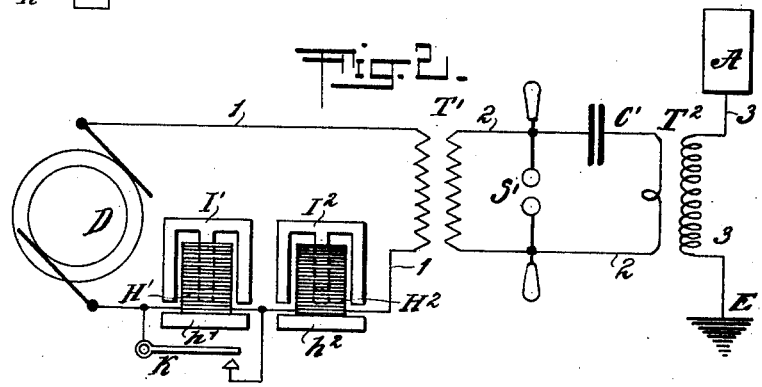
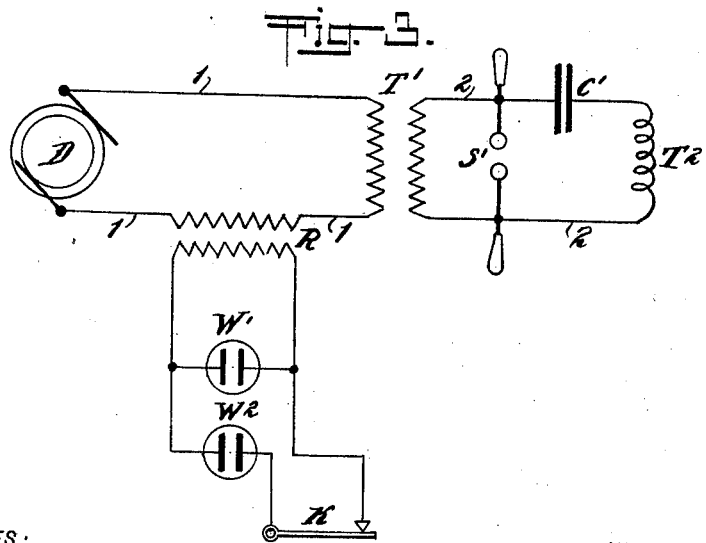

No. 758,004.

Patented April 19, 1904.

UNITED STATES PATENT OFFICE.

JOHN AMBROSE FLEMING, OF LONDON, ENGLAND, ASSIGNOR TO MARCONI'S WIRELESS TELEGRAPH COMPANY, LIMITED, OF LONDON, ENGLAND.

DEVICE FOR WIRELESS TELEGRAPHY.

SPECIFICATION forming part of Letters Patent No. 758,004, dated April 19, 1904.

Application filed April 8, 1901. Serial No. 54,775. (No model.)

*To all whom it may concern:*

Be it known that I, JOHN AMBROSE FLEMING, a subject of the King of Great Britain, residing and having a post-office address at University College, Gower street, in the city of London, England, have invented certain new and useful Devices for Wireless Telegraphy, of which the following is a specification.

This invention relates to transmitting apparatus for signaling by wireless telegraphy by those methods which depend upon the production of electric or Hertz waves.

When it is desired to produce electric waves of great energy for long-distance wireless telegraphy, it is undesirable to employ, as heretofore, induction or spark coils the primary circuit of which has a key for interrupting the current and the secondary circuit of which is connected to the apparatus for creating the waves.

For long-distance Hertz-wave telegraphy an alternating-current dynamo or alternator associated with an alternating-current transformer is employed for providing alternating current of high pressure. The terminals of this high-tension transformer are connected to a pair of spark-balls, the spark-balls being closed through a condenser joined in series with the primary circuit of an oscillation-transformer. The secondary circuit of this oscillation-transformer either has its terminals connected one to earth or other capacity and the other to an insulated aerial conductor or they may be connected with another pair of spark-balls which in turn are connected by another condenser to another oscillation-transformer the secondary of which has its terminals connected one to earth or other capacity and the other to an insulated aerial conductor. Whichever method is employed, it is necessary in order to send out groups of Hertz waves which may be interpreted at a distance into intelligible signals to have arrangements which will effect the following ends: In the first place the alternating-current dynamo and transformer must charge the condenser and then permit the condenser to discharge itself across the first-mentioned spark-balls; but at the same time it is not desirable that the alternating-current transformer shall start a permanent alternating-current arc between the spark-balls closing the secondary circuit of the transformer. In the next place it must be possible to interrupt this oscillatory spark at pleasure and to produce trains of oscillatory sparks of long and short duration, and so establish in the successive oscillatory transformers electrical oscillations which eventually expend themselves in making Hertz waves which are radiated from an aerial. Hitherto when an induction or spark coil has been employed for the production of Hertz waves and when a key has been provided in the primary circuit for interrupting the current in it there is considerable risk in opening and closing the primary circuit of an alternating-current transformer which is fed with high-tension current, while at the same time the secondary circuit is closed either by spark-balls or through a condenser. The sudden interruption of the primary circuit gives rise to very considerable inductive electromotive forces, which may break down the insulation of the transformer.

According to this invention the primary circuit of the alternating-current transformer is preferably permanently closed and never opened, the current passing in it being regulated by external means, preferably by varying the impedance of a coil in the primary.

Figure 1 shows diagrammatically an apparatus constructed according to this invention. Fig. 2 represents a modification of Fig. 1 in which there is but one high-frequency condenser-circuit besides the aerial instead of two, as shown in Fig. 1. Fig. 3 represents a variation in which the impedance in the alternator-circuit is produced not by a choking-coil, as in Fig. 1, but by a transformer R, the secondary circuit of which can be more or less reduced in resistance by a variable water resistance. Fig. 4 is a longitudinal section of our oscillation-transformer which may be used.

In Figs. 1, 2, and 3, D is an alternating-current dynamo driven by a steam-engine or other motor and which may conveniently be of a size called "twenty-five kilowatt." This alternator yields a current at a pressure of, say, two thousand volts, and this alternating current is transmitted by the permanently-closed circuit 1 into the primary coil of an ordinary alternating-current transformer T', which raises the pressure from two thousand volts to, say, twenty thousand. This transformer should be of a size known as "twenty to twenty-five kilowatt" and be an ordinary iron-core transformer. The secondary terminals of this transformer are connected by the circuit 2 to a pair of adjustable metal spark-balls S', which may conveniently be iron balls two inches in diameter carried on the ends of metal rods, to which are attached insulating-handles supported and moved to and from one another in any convenient manner. The circuit 2 contains a condenser C' and the primary coil of an oscillation-transformer $T^2$. The condenser C' should be adjustable or one built up in sections. It may conveniently consist of eighteen to twenty boxes, each containing twelve glass plates eighteen inches square coated on both sides with tin-foil one foot square, the glasses being about one-tenth of an inch thick and held about one-eighth of an inch apart. All the tin-foil sheets on the two sides of the glass are respectively joined together, so as to form one large Leyden jar having, as it were, twelve square feet of coated surface. Such a twelve-plate condenser would have a capacity of about one-thirtieth of a microfarad, and from one to twenty of such units may be employed, making in all from one-thirtieth to two-thirds of a microfarad or more.

It is desirable to fill up the condenser-boxes with double-boiled linseed-oil, as this insulating-oil prevents discharges taking place over the ends of the plates.

The oscillation-transformer $T^2$, the details of which are shown in Fig. 4, consists of a primary coil which is made by winding highly-insulated electric-light cable $a$ on a wooden drum $b$. This drum may be conveniently one foot in diameter and five feet long and have on it four lengths of electric-light cable consisting of seven wires, each about 1.65 millimeters in diameter, insulated with best india-rubber. These four cables are joined in parallel and wound on into a coil of twenty turns, each turn being separated by one lap of rope $c$ the same thickness as the electric-light cable. The object of this arrangement is to give the primary coil a self-induction which is not too large. Over this primary coil are wound several sheets of thin ebonite $d$, and on the outside of this ebonite tube are placed a series of coils, which constitute the secondary coil of the transformer. The secondary coils are made in the following manner: A disk of ebonite $e$ or other insulating material is taken, and a length of highly-insulated electric-light cable $f$, similar to $a$, is passed through the central opening of the disk and then wound up in a flat spiral on either side of the disk, so as to form one coil of twenty turns, ten turns on each side of the disk, the two ends of the coil being both at the outside. This flat coil is bound together with tape. A number of these flat coils—say sixteen to eighteen—are arranged upon the outside of the primary and joined up in series, so as to make an oscillation-transformer, the primary coil of which consists of twenty turns and the secondary circuit of, say, three hundred and sixty turns. These exact proportions are not limited; but they may be conveniently adopted. This oscillation-transformer is placed in a large wooden vat which is filled up with double-boiled linseed-oil, and it constitutes a transformer having a primary and secondary circuit of very low resistance. In Fig. 1 the secondary circuit of this oscillation-transformer is connected by the circuit 3 to two metal spark-balls $S^2$ and these again to another condenser $C^2$. This second condenser should consist of about sixteen condenser-boxes similar to those above described, each having a capacity of about one-thirtieth microfarad, and these sixteen condenser-boxes should be joined up four in series and four in parallel, so as to form a single condenser capable of standing very high pressure and having a capacity of one-thirtieth microfarad. This condenser is joined in series with the primary circuit of a third transformer $T^3$, which is made similar to the transformer $T^2$ except that its primary circuit consists of only four to five turns and its secondary circuit may be of ten to twelve turns. Both these circuits are constructed of highly-insulated electric-light cable, which may conveniently consist of 7 wires, each about 1.65 millimeters in diameter, and they are wound upon a square or round wooden frame, which is immersed in a vat of linseed-oil. One end of the secondary circuit 4 of this last transformer is connected to the earth or other capacity E and the other to the insulated aerial conductor A.

The whole above-described apparatus constitutes, therefore, an arrangement for multiplying electric pressures and multiplying the frequency of electrical oscillations.

The arrangement shown in Fig. 2 is exactly the same as that shown in Fig. 1 except that the spark-balls $S^2$, condenser $C^2$, and transformer $T^3$ are omitted, the ends of the circuit 3 instead of 4 being connected to E and A, respectively.

In addition to the foregoing apparatus devices have to be employed for varying the current in the circuit 1 and preventing the establishment of a permanent arc at the spark-balls S'.

In Figs. 1 and 2 two choking-coils H' and $H^2$ are placed in the circuit 1 of the alternator. These have iron cores I' and $I^2$, which can be more or less inserted into the coils. These cores may be conveniently made the shape of the letter E and can be let down more or less into the wire coil, so as to create a greater or less impedance in the circuit of the coil. Each coil consists of a cylindrical bobbin of wire of two thousand turns, the wire being known as size No. 10, standard wire gage; but as a general rule the choking-coil would have to be wound with a size of wire suitable for carrying the full-load primary current of the transformer. This choking-coil has an aperture six inches in diameter and an over-all diameter of twelve inches and a height of eighteen inches. The iron core which is let down into it has a sectional diameter of eight square inches in the middle stem. The bottom yoke is of such dimensions that when the iron core is let down as far as it will go the iron circuit is complete. It is desirable to stand the coils upon iron plates $h'$ $h^2$. Two of these coils $H'$ $H^2$ are inserted in the circuit 1 of the alternator, and the iron core of one of them—say $H^2$—is so adjusted that no greater current can flow through the primary circuit of the transformer $T'$ than that transformer is fitted to carry safely even although the spark-balls $S'$ may be in contact with one another. Then the iron core of the other choking-coil $H'$ is lowered right down into its coil, and the impedance created by the lowering of the coil is only sufficient to prevent the forming of an alternating-current arc across the spark-gap $S'$. The coil, however, of this last choking-coil can be short-circuited by a key K, and the current through the transformer $T'$ then at once increases to its full value. The two choking-coils, taken together with the key, constitute, therefore, an arrangement for starting or stopping the largest possible safe current through the primary of the transformer $T'$ without ever opening the circuit of the alternator. It is found possible then to so adjust the position of the iron core of $H^2$ that no permanent arc is established at the balls $S'$, but the condenser $C'$ is charged and discharged through the primary coil of the oscillation-transformer whenever the choking-coil $H'$ is short-circuited. Under these circumstances there is complete control over the oscillations established in the condenser-circuit, and they can be started and stopped at pleasure. These oscillations are in Fig. 1 tranformed by the oscillation-transformer $T^2$ to a higher pressure and frequency, and by adjusting the spark-balls $S^2$ until the discharge passes between them a second and entirely distinct set of oscillations (the period of which is determined by the capacity of the inductance in the circuit which contains the condenser $C^2$, the spark-gap $S^2$, and the primary circuit of the transformer $T^3$) can be set up in the circuit of the condenser $C^2$ and throw off from the aerial A trains of electric waves whenever the key K is pressed down.

Instead of employing the two choking-coils $H'$ and $H^2$ the method shown in Fig. 3 may be employed, which consists in introducing the primary coil of a regulating-transformer R into the circuit 1 of the alternator and closing the secondary circuit of this regulating-transformer through two water resistances $W'$ and $W^2$. The regulating-transformer must be of the same power output as the high-tension transformer. Thus, for instance, if the alternator gives a pressure of two thousand volts and if the high-pressure transformer raises this to twenty thousand volts and has a power output of twenty thousand watts then the primary current of the two-thousand-volt side will be ten amperes. The regulating-transformer would then be an ordinary alternating-current machine technically known as a "twenty-kilowatt transformer" transforming down from two thousand to two hundred volts, and the two-thousand-volt side or coil would be inserted in series with the circuit of the alternator and the two-thousand-volt side of the high-pressure transformer. The water resistances consist of two tubs, each about eighteen inches in diameter and two and one-half feet high, standing on insulating-tables. Each of these tubs contains a cylindrical lining of sheet-lead and also another cylinder of lead suspended by a rope and pulley, so as to be capable of being let down more or less into the water, which nearly fills the tub. It is desirable to add wooden guides to prevent the inner cylinder touching the outer. These water resistances are connected, through keys, with the two-hundred-volt side of the regulating-transformer.

When the secondary circuit of the regulating-transformer is an open circuit, it throttles or impedes the passage of the current into the transformer $T'$; but when the secondary circuit is more or less closed by the key K through the water resistance the current flows into the transformer $T'$, and it is possible to adjust the water resistances so that while establishing the oscillations in the condenser-circuit a permanent electric arc at the balls $S'$ is prevented.

A third method for carrying out my present invention is described and claimed in an application, Serial No. 81,661, filed by me November 6, 1901, as a division of my present application. Such divisional application describes and shows, among other features of invention, means for utilizing blasts of air in long or short puffs to extinguish arcs.

In elaboration of the description of the practice of my present invention I will for the sake of simplicity deal only with the apparatus shown in Fig. 2 of the drawings. The normal condition in the circuit of the alternator—viz., circuit 1—when the key is open is such that by adjustment of the cores of the choking-coils the impedance in that circuit is so large that the current which flows through the primary circuit of the transformer $T'$ is so much reduced below the normal value proper to that transformer on open circuit that the potential at the secondary terminals—*i. e.*, at the spark-balls S'—is not sufficient to cause a spark or an arc to jump across the distance at which the balls are set. This alternating-current potential therefore simply makes a small current flow backward and forward into the condenser, this current having a frequency agreeing with that of the alternator D. If, however, the key K for short-circuiting one of the choking-coils is closed, then the current through the primary circuit of the transformer T' is increased to a point at which the potential between the balls rises up to some value determined by the construction of that transformer, but which is much higher than that when the choking-coil is on open circuit. This alternating potential forces a current into and out of the condenser C', and if the inductance of the primary circuit of the transformer $T^2$ and the capacity of the condenser C' are so adjusted that the period of electrical oscillation of the circuit comprised by this coil and the condenser and the spark-gap when a spark is happening is in accordance with the frequency of the alternator then this alternating potential will gradually, by the action of the resonance, be increased to a value far above that which would exist at the spark-balls if the condenser was disconnected. If the balls are then adjusted to the proper distance, it is possible to cause this exalted potential to create a spark between the balls, and the condenser then discharges backward and forward through the path so formed and through the primary circuit of the oscillation-transformer. If, however, the primary circuit of transformer T' is not throttled at all by any impedance, then the discharge of the condenser across the spark-gap would be accompanied by an alternating-current arc, due to the transformer, taking place between the balls S', and this arc, in virtue of the properties of an electric arc, would continue some time after the potential at the terminals of the transformer had died away and after the condenser was completely discharged. Hence as the potential of the spark-balls rises up again during the next period it would find the spark-gap occupied by an arc, and unless this arc is destroyed the potential between the balls S' would not rise above a few volts, probably fifty or one hundred and insufficient to make any oscillations worth speaking of in the condenser-circuit. Under the conditions described, therefore, it is obvious that the condenser cannot become charged to a high potential, and therefore produce oscillations when it discharges, unless the space between the spark-balls is periodically freed from all products of decomposition of atoms and brought back into a perfect non-conducting condition. It is the function of the second choking-coil $H^2$, Figs. 1 and 2, or of the water resistance W', Fig. 3, to effect this adjustment in the primary circuit of the transformer T', whereby the establishment of a permanent arc between the spark-balls S' is prevented.

The secondary of the transformer $T^2$, Figs. 3 and 4, may either be connected to a transformer $T^3$, as shown in Fig. 1, or directly to A and E, as shown in Fig. 2.

What I claim is—

1. In apparatus for producing electrical oscillations of high frequency, the combination of a transformer, the primary circuit of which is permanently closed; means for producing an alternating current in the primary; means, controlled by a signal-key, for varying the current in the primary; a producer of electrical oscillations in the secondary circuit of said transformer, and a radiating conductor for said apparatus.

2. In apparatus for producing electrical oscillations of high frequency, the combination of a transformer, the primary circuit of which is permanently closed; means for producing an alternating current in the primary; a coil in said primary; a signaling-key and connections for varying the current through said coil; a producer of electrical oscillations in the secondary circuit of said transformer, and a radiating-conductor for said apparatus.

3. In apparatus for producing electrical oscillations of high frequency, the combination of a transformer, the primary circuit of which is permanently closed; means for producing an alternating current in the primary; a coil in the primary circuit; a signaling-key and connections for short-circuiting said coil; a producer of electrical oscillations in the secondary circuit of said transformer, and a radiating-conductor for said apparatus.

4. The combination of four circuits containing three transformers, the first circuit containing the primary of the first transformer, the second circuit containing the secondary of the first transformer and the primary of the second transformer, the third circuit containing the secondary of the second transformer and the primary of the third transformer, and the fourth circuit containing the secondary of the third transformer and having one end connected to an aerial conductor and the other end to a capacity which may be the earth, a condenser in the second circuit, a spark-gap in the second circuit in parallel with the primary of the second transformer and the condenser, a condenser in the third circuit, a spark-gap in the third circuit in parallel with the primary of the third transformer and the condenser, and means for producing an alternating current in the first circuit.

5. The combination of a plurality of circuits containing transformers, the first circuit being permanently closed containing the primary of one transformer, the second circuit containing the secondary of said transformer and the primary of another transformer, a condenser in the second circuit, a spark-gap in the second circuit in parallel with the primary of the second transformer and the condenser, means for producing an alternating current in the first circuit, means for preventing the establishment of a permanent arc in the spark-gap of the second circuit, and radiating-conductor for the apparatus.

6. The combination of four circuits containing three transformers, the first circuit containing the primary of the first transformer, the second circuit containing the secondary of the first transformer and the primary of the second transformer, the third circuit containing the secondary of the second transformer and the primary of the third transformer, and the fourth circuit containing the secondary of the third transformer and having one end connected to an aerial conductor and the other end to a capacity which may be the earth, a condenser in the second circuit, a spark-gap in the second circuit in parallel with the primary of the second transformer and the condenser, a condenser in the third circuit, a spark-gap in the third circuit in parallel with the primary of the third transformer and the condenser, means for producing an alternating current in the first circuit, and means for preventing the establishment of a permanent arc in the spark-gap of the second circuit.

7. The combination of a plurality of circuits containing transformers, the first circuit being permanently closed containing the primary of one transformer, the second circuit containing the secondary of said transformer and the primary of another transformer, a condenser in the second circuit, a spark-gap in the second circuit in parallel with the primary of the second transformer and the condenser, means for producing, means for varying an alternating current in the first circuit, and a radiating-conductor for the apparatus.

8. The combination of four circuits containing three transformers, the first circuit containing the primary of the first transformer, the second circuit containing the secondary of the first transformer and the primary of the second transformer, the third circuit containing the secondary of the second transformer and the primary of the third transformer, and the fourth circuit containing the secondary of the third transformer and having one end connected to an aerial conductor and the other end to a capacity which may be the earth, a condenser in the second circuit, a spark-gap in the second circuit in parallel with the primary of the second transformer and the condenser, a condenser in the third circuit, a spark-gap in the third circuit in parallel with the primary of the third transformer and the condenser, means for producing and means for varying an alternating current in the first circuit.

9. The combination of a plurality of circuits containing transformers, the first circuit being permanently closed and containing the primary of one transformer, the second circuit containing the secondary of said transformer and the primary of another transformer, a spark-gap in the second circuit in parallel with the primary of the second transformer and the condenser; means for producing an alternating current in the first circuit; a coil in said first circuit; a signaling-key and connections for varying the current through said coil, and a radiating-conductor for said apparatus.

10. The combination of four circuits containing three transformers, the first circuit containing the primary of the first transformer, the second circuit containing the secondary of the first transformer and the primary of the second transformer, the third circuit containing the secondary of the second transformer and the primary of the third transformer, and the fourth circuit containing the secondary of the third transformer and having one end connected to an aerial conductor and the other end to a capacity which may be the earth, a condenser in the second circuit, a spark-gap in the second circuit in parallel with the primary of the second transformer and the condenser, a condenser in the third circuit, a spark-gap in the third circuit in parallel with the primary of the third transformer and the condenser, means for producing an alternating current in the first circuit, a coil in the first circuit, and means for varying the impedance of the coil.

11. The combination of a plurality of circuits containing transformers, the first circuit containing the primary of one transformer, the second circuit containing the secondary of said transformer and the primary of another transformer, a condenser in the second circuit, a spark-gap in the second circuit in parallel with the primary of the second transformer and the condenser, means for producing an alternating current in the first circuit, a coil in the first circuit, means for short-circuiting the coil, and a radiating-conductor for the apparatus.

12. The combination of four circuits containing three transformers, the first circuit containing the primary of the first transformer, the second circuit containing the secondary of the first transformer and the primary of the second transformer, the third circuit containing the secondary of the second transformer and the primary of the third transformer, and the fourth circuit containing the secondary of the third transformer and having one end connected to an aerial conductor and the other end to a capacity which may be the earth, a condenser in the second circuit, a spark-gap in the second circuit in parallel with the primary of the second transformer and the condenser, a condenser in the third circuit, a spark-gap in the third circuit in parallel with the primary of the third transformer and the condenser, means for producing an alternating current in the first circuit, a coil in the first circuit, and means for short-circuiting the coil.

13. In apparatus for producing electrical oscillations of high frequency, the combination of a transformer the primary circuit of which is permanently closed, means for producing an alternating current in the primary, two coils in circuit with the primary, movable cores in the coils, and means for short-circuiting one of the coils.

14. The combination of a plurality of circuits containing transformers, the first circuit containing the primary of one transformer, the second circuit containing the secondary of said transformer and the primary of another transformer; a condenser in the second circuit; a spark-gap in the second circuit in parallel with the primary of the second transformer and the condenser, means for producing an alternating current in the first circuit, two coils in the first circuit, movable cores in the coils, means for short-circuiting one of the coils, and a radiating-conductor for the apparatus.

15. The combination of four circuits containing three transformers, the first circuit containing the primary of the first transformer, the second circuit containing the secondary of the first transformer and the primary of the second transformer, the third circuit containing the secondary of the second transformer and the primary of the third transformer, and the fourth circuit containing the secondary of the third transformer and having one end connected to an aerial conductor and the other end to a capacity which may be the earth, a condenser in the second circuit, a spark-gap in the second circuit in parallel with the primary of the second transformer and the condenser, a condenser in the third circuit, a spark-gap in the third circuit in parallel with the primary of the third transformer and the condenser, means for producing an alternating current in the first circuit, two coils in the first circuit, movable cores in the coils, and means for short-circuiting one of the coils.

16. At a transmitting-station employed in wireless telegraphy, the combination of a transformer having a permanently-closed primary circuit, a generator, and an impedance-coil in said circuit, a shunt around said coil, a circuit-closer in said shunt in circuit with the primary circuit of the transformer and a spark-gap and a radiating-conductor for said apparatus.

17. At a transmitting-station employed in wireless telegraphy, an oscillation-transformer, the primary circuit of which is permanently closed; a second oscillation-transformer connected with that first named; a producer of electrical oscillations connected with the secondary circuit of each transformer; a radiating-conductor electrically connected with the apparatus; a signaling-key and a device controlled thereby for varying the power of the closed primary circuit aforesaid.

18. At a transmitting-station employed in wireless telegraphy, a permanently-closed primary circuit connected with a source of alternating current; a coil included in said circuit; a secondary winding connected with said coil; a signaling-key and connections for closing the circuit of said coil; an oscillation-producer connected with the apparatus, and a radiating-conductor also connected therewith.

19. At a transmitting-station employed in wireless telegraphy, a step-up oscillation-transformer the primary of which is permanently closed and is connected with a source of alternating current, and the secondary of which is connected with an oscillation-producer and with a radiating-conductor, substantially as described.

20. At a transmitting-station employed in wireless telegraphy, an oscillation-transformer the primary of which is permanently closed and is connected with a source of alternating current; a second oscillation-transformer, the primary of which is in circuit with the secondary of the first-named transformer; and a radiating-conductor connected with the secondary of the second transformer, substantially as described.

21. At a transmitting-station employed in wireless telegraphy, an oscillation-transformer the primary of which is permanently closed and is connected with a source of alternating current; an oscillation-producer in circuit with the secondary of said transformer; a second oscillation-transformer, the primary of which is also in circuit with the said secondary, and a radiating-conductor connected with the secondary of the second transformer, substantially as described.

22. At a transmitting-station employed in wireless telegraphy, an oscillation-transformer the primary of which is connected with a source of alternating current; an oscillation-producer in circuit with the secondary of said transformer; a second oscillation-transformer, the primary of which is also in circuit with the said secondary; an oscillation-producer in circuit with the secondary of the second transformer, and a radiating-conductor for the apparatus, substantially as described.

JOHN AMBROSE FLEMING.

Witnesses:
R. B. RANSFORD,
FREDK. C. WEATHERLY.